(12) United States Patent
Mäkelä et al.

(10) Patent No.: US 8,213,657 B2
(45) Date of Patent: Jul. 3, 2012

(54) APPARATUS FOR PROVIDING AUDIO RELATED SIGNALS FOR AUDIO LOOPS AND ASSOCIATED METHODS

(75) Inventors: Jakke Mäkelä, Turku (FI); Niko Porjo, Piikkiö (FI)

(73) Assignee: Nokia Corporation, Espoo (FI)

( * ) Notice: Subject to any disclaimer, the term of this patent is extended or adjusted under 35 U.S.C. 154(b) by 996 days.

(21) Appl. No.: 12/165,508

(22) Filed: Jun. 30, 2008

(65) Prior Publication Data

US 2009/0323994 A1 Dec. 31, 2009

(51) Int. Cl.
*H04R 25/00* (2006.01)
(52) U.S. Cl. ............................ 381/331; 381/315; 379/52
(58) Field of Classification Search .................. 381/315, 381/331; 379/52, 442; 430/39
See application file for complete search history.

(56) References Cited

U.S. PATENT DOCUMENTS

| | | | | |
|---|---|---|---|---|
| 3,659,056 A * | 4/1972 | Morrison et al. | ............. | 381/315 |
| 5,010,575 A * | 4/1991 | Marutake et al. | ............. | 381/331 |
| 7,522,740 B2 * | 4/2009 | Julstrom et al. | ............. | 381/331 |
| 2001/0055386 A1 * | 12/2001 | Waldron et al. | ............. | 379/444 |
| 2002/0141545 A1 * | 10/2002 | Segovia | ........................ | 379/52 |
| 2004/0252812 A1 * | 12/2004 | Waldron et al. | ............. | 379/52 |
| 2004/0258261 A1 * | 12/2004 | Cochran et al. | ............. | 381/315 |
| 2005/0117713 A1 * | 6/2005 | Waldron et al. | ............. | 379/52 |
| 2006/0018498 A1 * | 1/2006 | Hulskemper | ................. | 381/331 |
| 2006/0269088 A1 * | 11/2006 | Julstrom et al. | ............. | 381/315 |

* cited by examiner

*Primary Examiner* — Allan R Wilson
(74) *Attorney, Agent, or Firm* — Harrington & Smith

(57) ABSTRACT

There is provided an apparatus comprising a primary winding and a corresponding primary core element, the primary winding/core element configured for the transmission of audio related signalling, using inductive coupling, with an appropriately positioned secondary core element/winding, the apparatus for providing induced audio related signals for an audio loop.

26 Claims, 9 Drawing Sheets

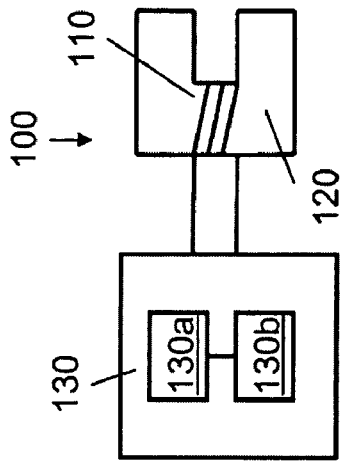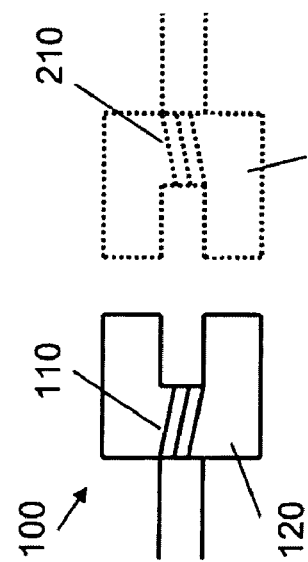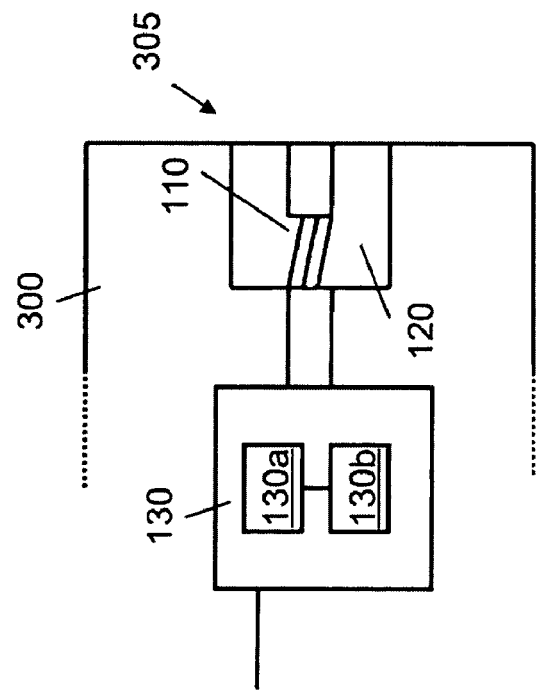

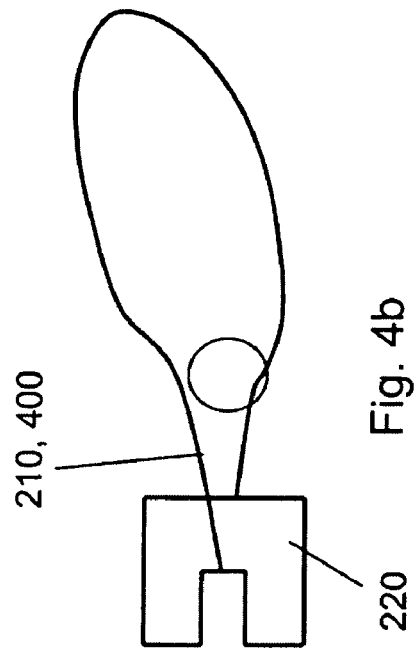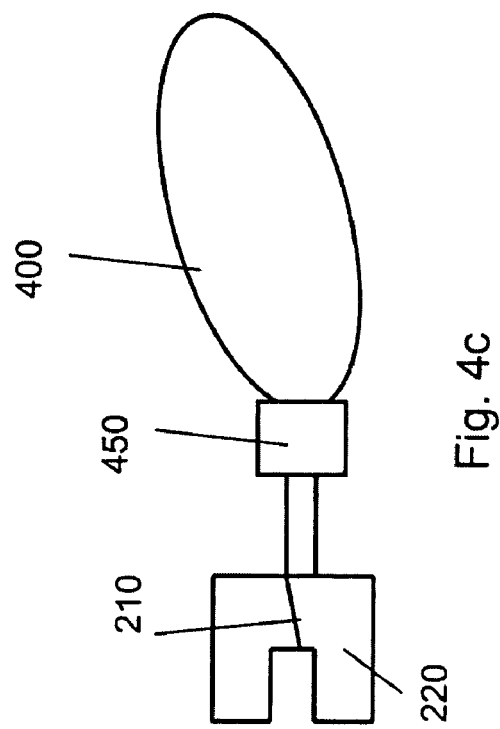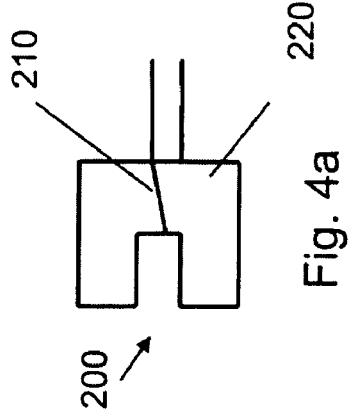

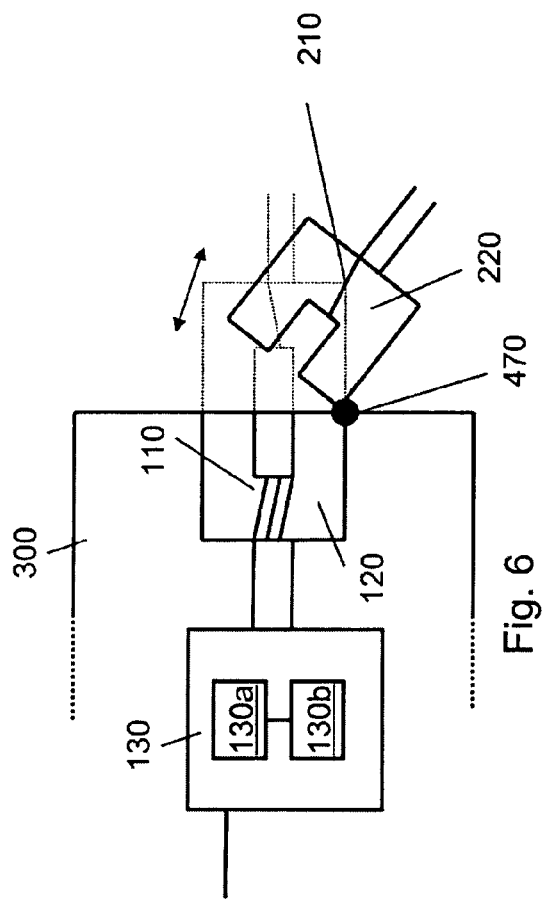
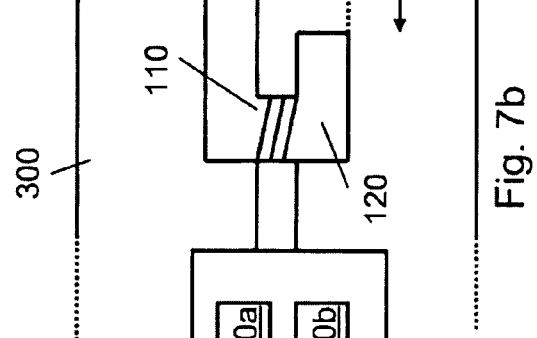
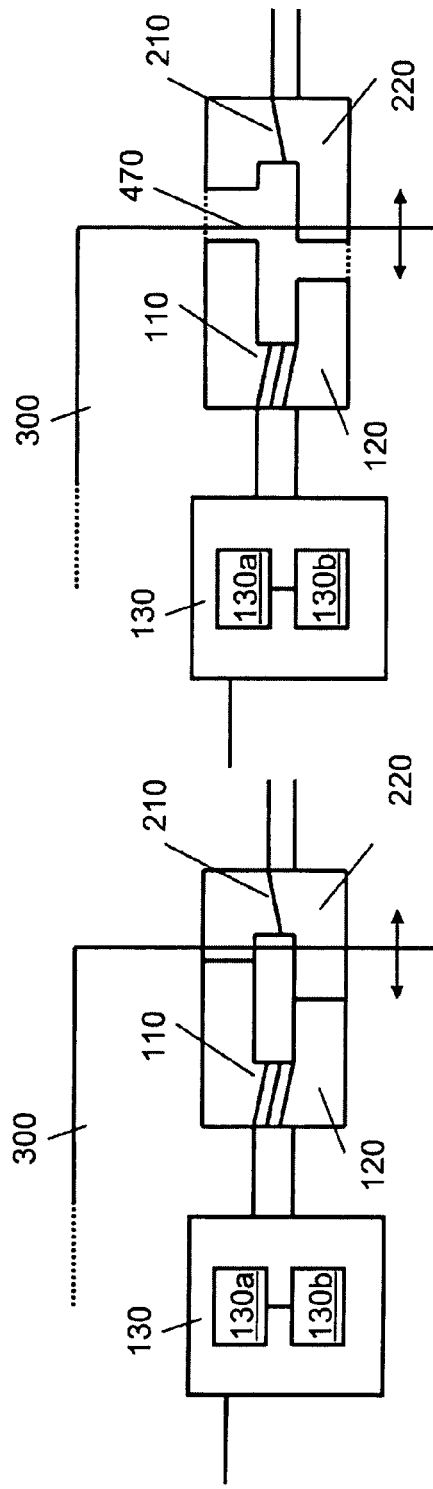

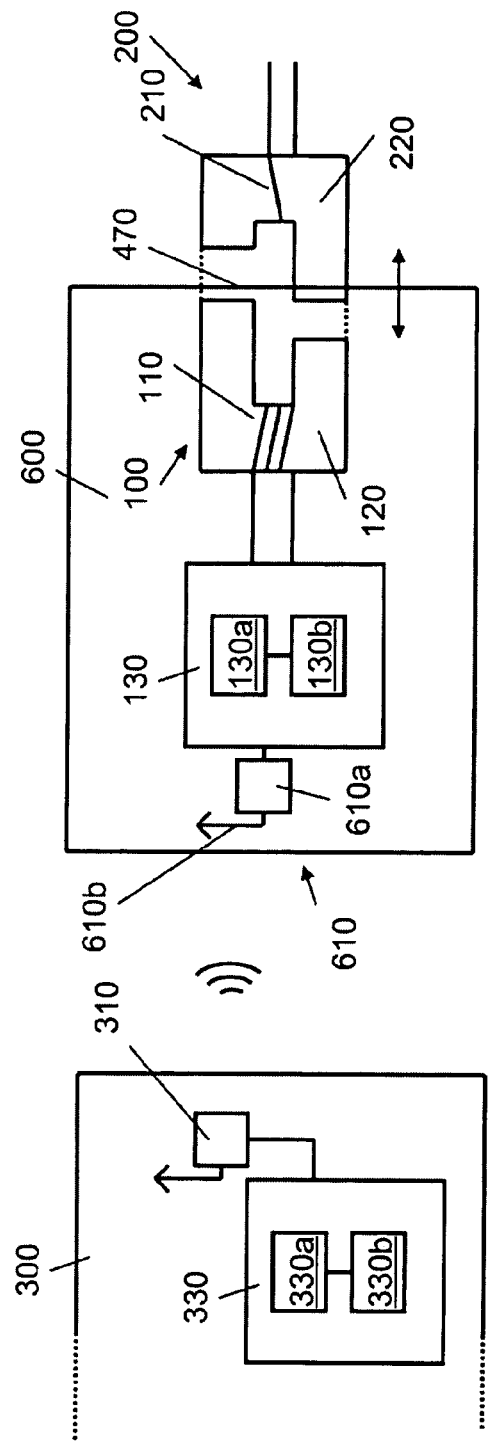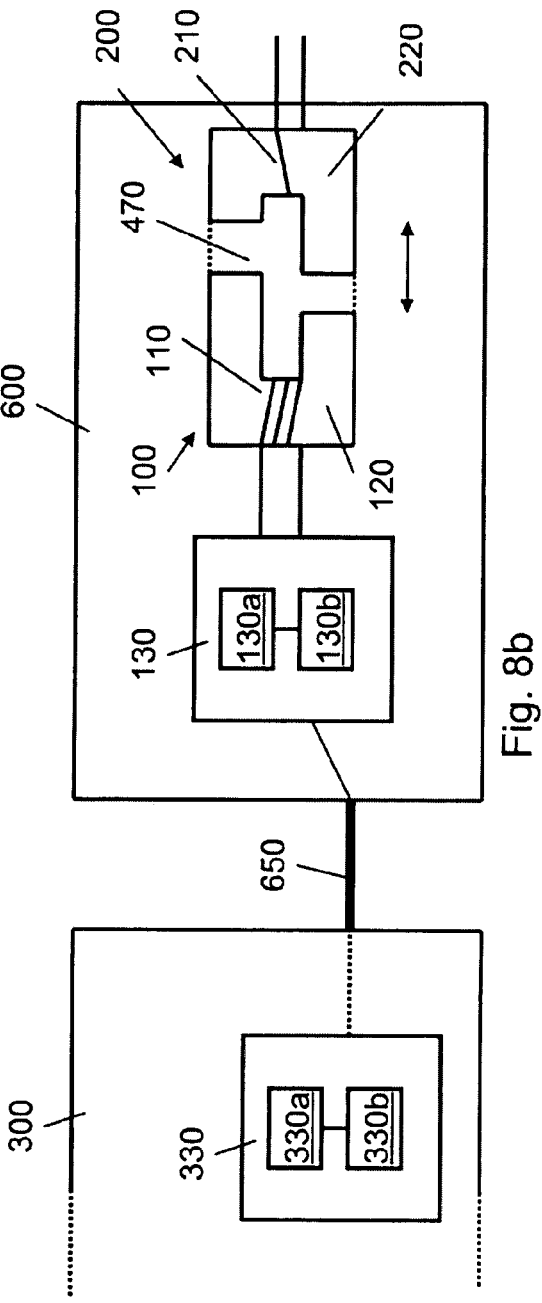

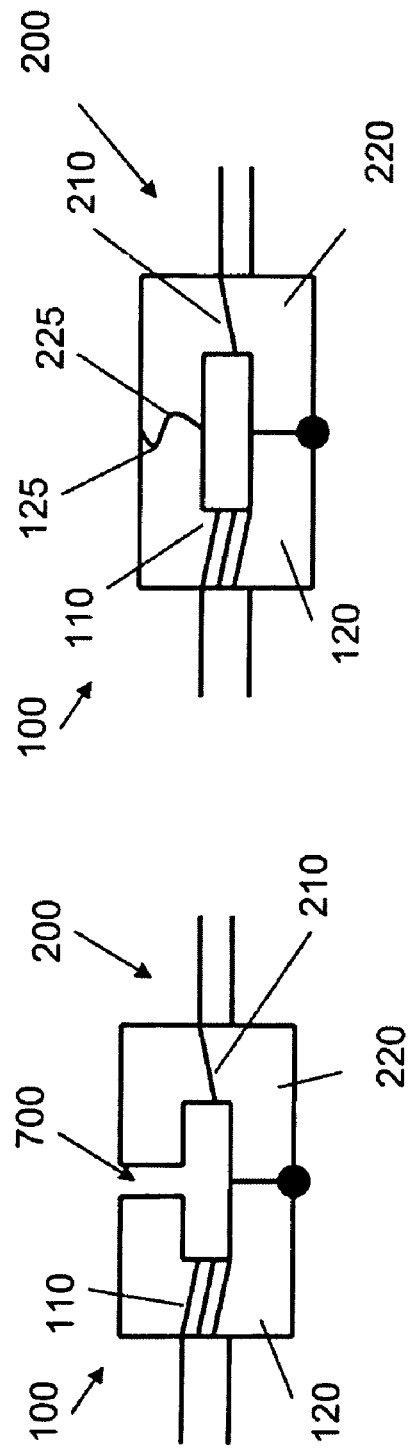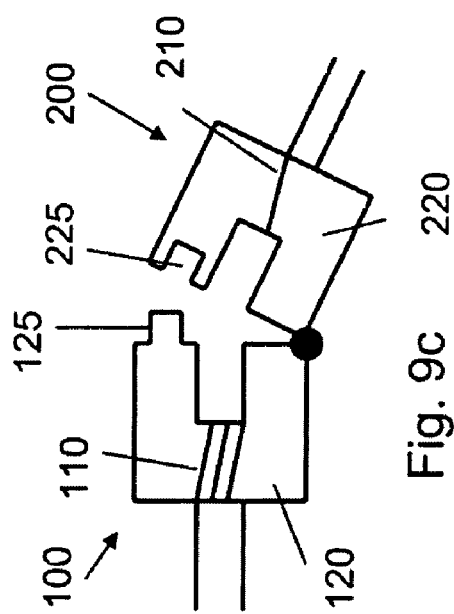

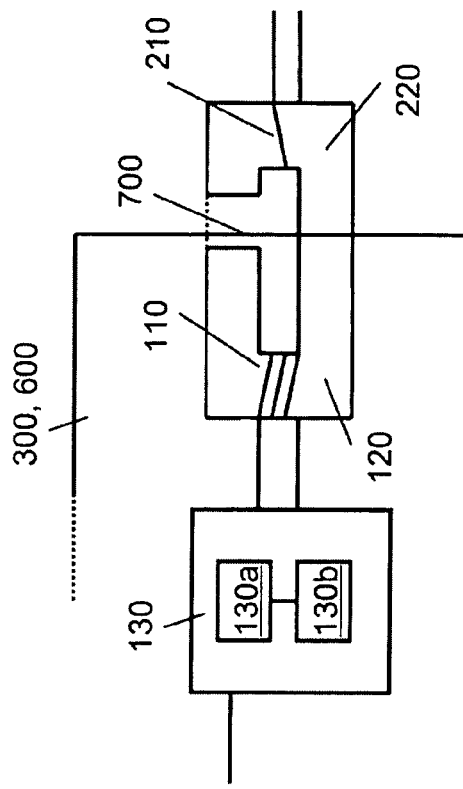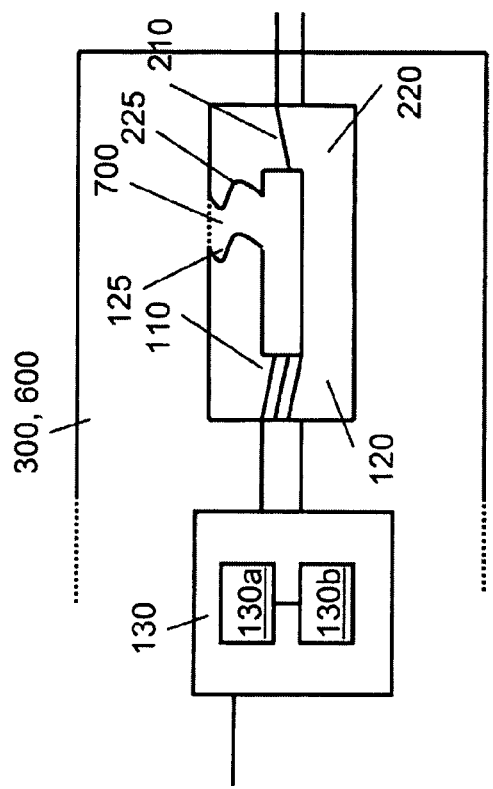

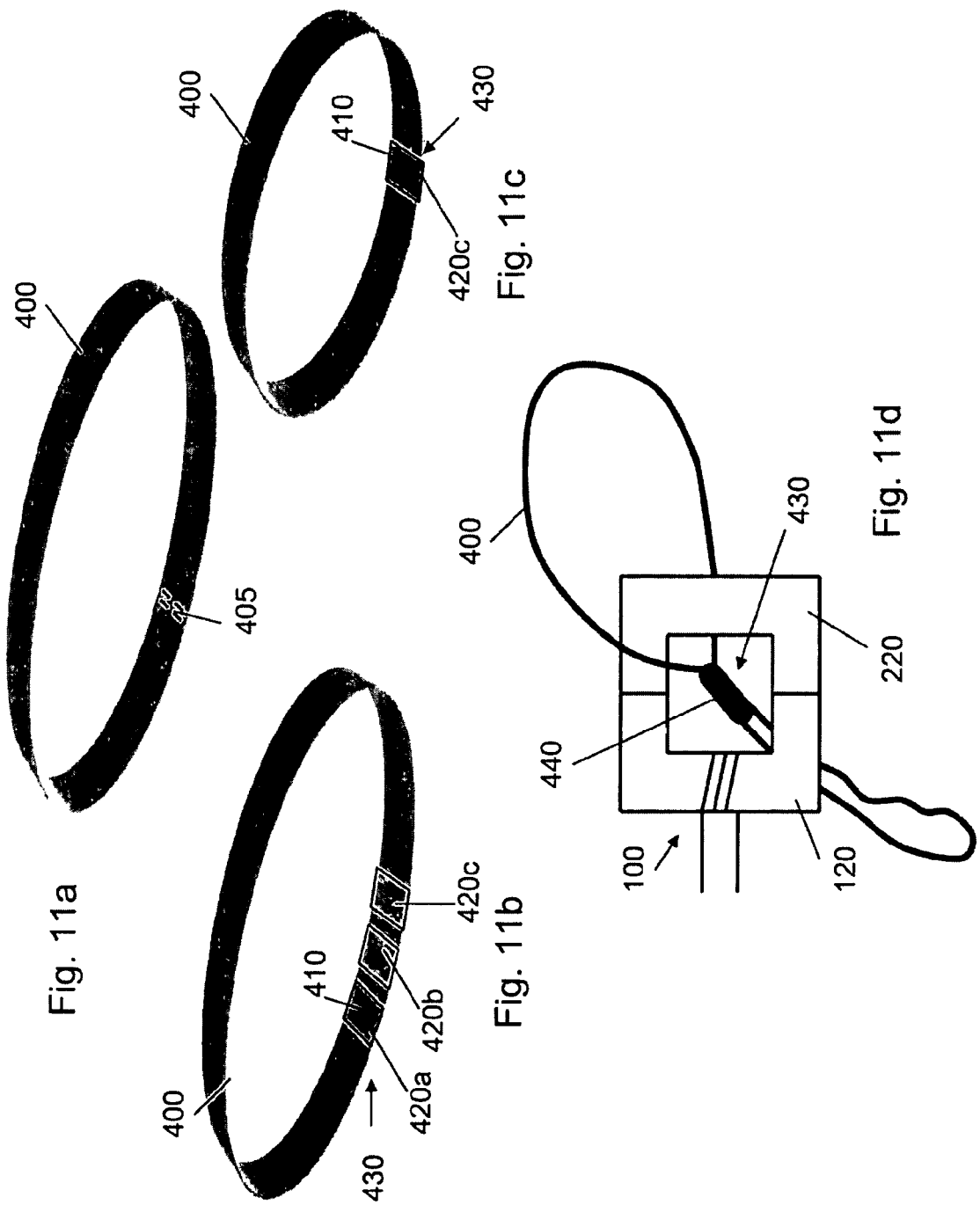

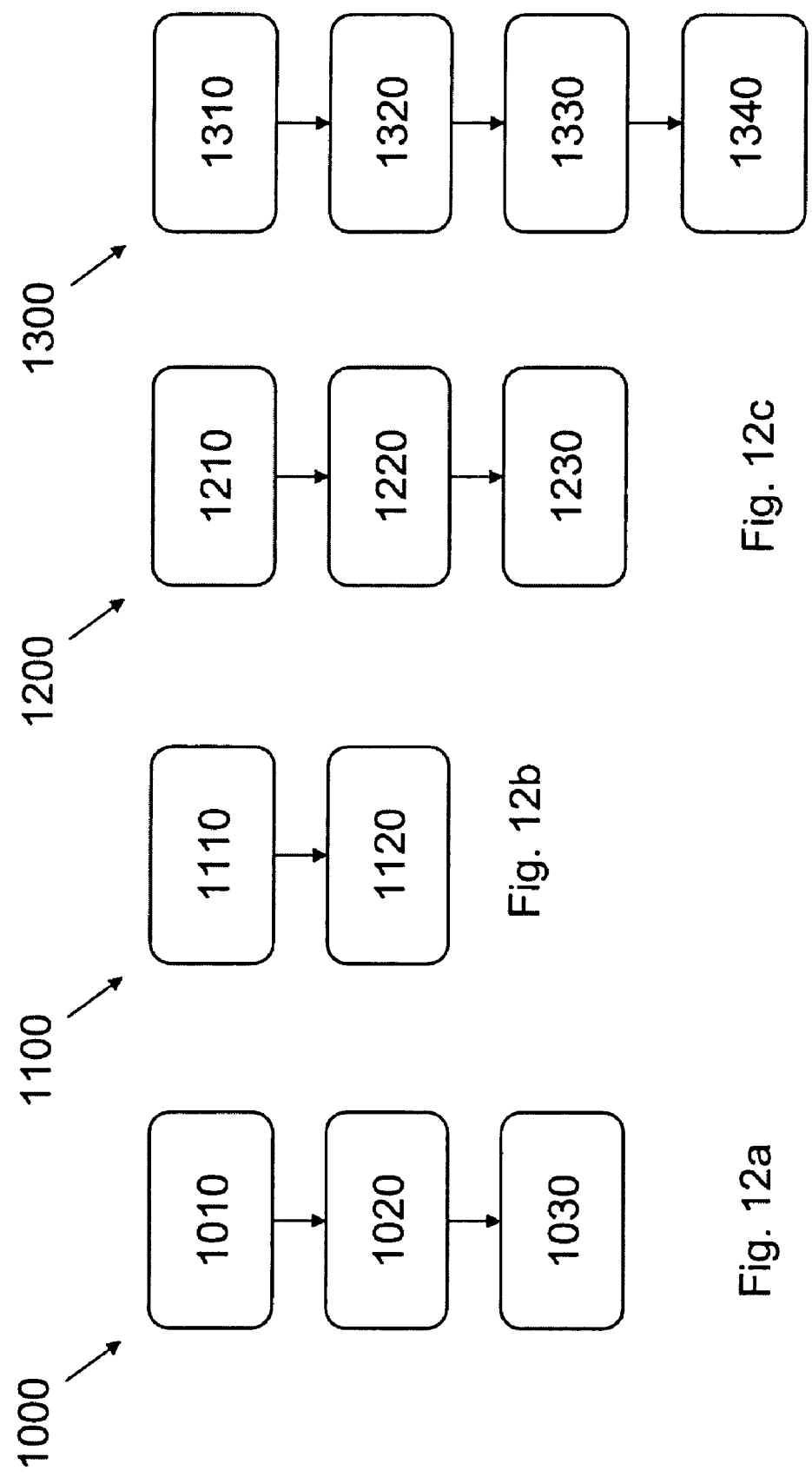

APPARATUS FOR PROVIDING AUDIO RELATED SIGNALS FOR AUDIO LOOPS AND ASSOCIATED METHODS

TECHNICAL FIELD

The present invention relates to the field of apparatus for providing audio related signals for audio loops and associated methods. Certain embodiments of the invention relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices of the present invention may provide one or more audio/text/video communication functions (e.g. telecommunication, videocommunication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions. The audio related signalling for each of these functions may be provided for audio loops.

BACKGROUND

For those of diminished hearing (hard of hearing), there are provided hearing aids. As well as processing audio signals, in some instances, hearing aids are configured to receive and process varying magnetic field signals relating to audio signals (e.g. magnetic fields whose frequency range is similar to that of audio frequency range). These varying magnetic field signals can be used to provide a corresponding audio output to a user. The use of such hearing aids allows for an improved audio output for the user in some instances, such as when using a telephone. An example of one such system is the telecoil (T-coil).

The varying magnetic fields for such hearing aids can be provided by inducing a conductor. In some instances a loop is provided. The loop will be a conductive material, generally of relatively low resistance (e.g. to provide suitable current carrying characteristics), which can be used to provide a varying electromagnetic field. A loop for providing the varying magnetic field for use with an appropriate configured hearing aid can be called a "loopset". Such a loop may be carried by a user for use, or located where it is to be used (e.g. a loop embedded in a floor at a bank, theatre, etc).

The varying electromagnetic field can be received (and processed) by an appropriately positioned hearing aid (e.g. a hearing aid, such as those comprising a telecoil, or so-called T-coil) so as to provide a suitable acoustic output for the wearer. Portable electronic devices, such as mobile telephones, generally have an acoustic output (e.g. a speaker arrangement).

The listing or discussion of a prior-published document or any background in this specification should not necessarily be taken as an acknowledgement that the document or background is part of the state of the art or is common general knowledge. One or more aspects/embodiments of the present invention may or may not address one or more of the background issues.

SUMMARY

According to a first aspect there is provided an apparatus comprising a primary winding and a corresponding primary core element, the primary winding/core element configured for the transmission of audio related signalling, using inductive coupling, with an appropriately positioned secondary core element/winding, the apparatus for providing induced audio related signals for an audio loop.

The apparatus may be configured such that it provides for a secondary winding to be removable with respect to the primary core element/windings. The apparatus may be configured such that a secondary core element/winding is movable/removable with respect to the primary core element/windings (e.g. so as to provide for appropriate positioning). The secondary core element/winding may be movable/removable with respect to the primary core element, without requiring tools.

The apparatus may be configured for open/closed configurations with a secondary core element/winding. The apparatus may comprise a displacement mechanism for open/close positioning of a secondary core element with the primary core element. The apparatus may be configured to allow for the addition/removal of a secondary winding from a secondary core element when in an open configuration.

The apparatus may be configured such that the primary core element is appropriately positioned with a secondary core element so as to be adjoined (e.g. positioned adjacent, affixed, etc.) but define elsewhere an aperture therebetween. The aperture may be configured to allow for addition/removal of a secondary winding.

The primary core element may be configured to be positioned with a secondary core element over an intermediate gap. The intermediate gap may be at least a portion of a (e.g. an exterior) casing of a portable electronic device. The intermediate gap may be an air gap. That is the intermediate gap acts to space a secondary core element from a primary core element, when appropriately positioned.

The primary core element may be configured to be positioned with a secondary core element over at least a portion of a casing of a portable electronic device (e.g. the casing may at least partially, if not fully, define the intermediate gap).

The apparatus may be configured to be attachable/detachable with a secondary core element.

The apparatus may further comprise control circuitry. The control circuitry may be in communication with the primary winding, for example, for providing audio related signalling to the primary winding for transmission with an appropriately positioned secondary winding/core element. The control circuitry may be configured with appropriate hardware/software so as to provide for transmission of audio related signalling.

The apparatus may further comprise a displacement mechanism. The displacement mechanism may be for open/close positioning of a secondary core element with respect to the primary core element. The displacement element may be configured to allow for the removal of a secondary winding from a secondary core element when in an open configuration.

The apparatus may further comprise a secondary core element. The secondary core element maybe connected to the displacement mechanism for open/close positioning (e.g. rotatable open/close positioning).

The apparatus may further comprise a secondary winding. The secondary winding may be configured about the secondary core element for communication of audio related signals.

The secondary winding may comprise a loop for providing inducing audio related signals. The secondary winding may be a loop. The secondary winding may be connected to a loop, such as connected via an adapter/connectors.

The loop may comprise a conductive polymer. The conductive polymer may be one of: an intrinsic conductive polymer; a blended conductive polymer (e.g. metallic particulates combined with polymer material); a polymer/conductive layer ribbon.

The loop may be a disposable/replaceable loop. The loop may comprise a cloth material (e.g. comprising a cloth material comprised/embedded with a conductive material, such as copper, copper ribbon). The loop may be provided by a loop of conductor, such as a conductor in a sheath.

The primary core element may be configured to be positioned with a secondary core element so as to provide a labyrinth region. The labyrinth region may be configured to hinder unintentional removal of a secondary winding from a secondary core element when in an open configuration.

According to a second aspect of the invention there is provided a portable device (e.g. a portable electronic device) comprising the apparatus according to the first aspect. The device may be one or more of: a cellular telephone; multimedia device; gaming device; navigation device; personal digital assistant; computer device (e.g. a computer device configured to provide VoIP (Voice Over IP Internet Protocol)); a supplementary module for a cellular telephone; a supplementary module for a multimedia device; a supplementary module for a gaming device; a supplementary module for a navigation device; a supplementary module for a personal digital assistant; a supplementary module for a computer device According to a third aspect there is provided an apparatus comprising a secondary core element, configured to receive a secondary winding, and configured for the transmission of audio related signalling using inductive coupling with an appropriately positioned primary core element/winding, the apparatus for providing induced audio related signals for an audio loop.

The secondary core element may be configured to be positioned with a primary core element over an intermediate gap, such as an air gap, and/or at least a portion of casing of a portable electronic device.

The secondary core element may be configured to be attachable/detachable with a primary core element.

The apparatus may further comprise a secondary winding, the secondary winding may be configured about the secondary core element to provide for transmission of audio related signalling for a loop The secondary winding may comprise a loop. The secondary winding may be provided by a loop. The secondary winding may be connected to a loop, e.g. via an adapter, connectors, etc.

The loop may comprise a conductive polymer. The conductive polymer may be one of: an intrinsic conductive polymer; a blended conductive polymer; a polymer/conductive layer ribbon.

According to a fourth aspect there is provided a secondary winding configured for use with a corresponding secondary core element, the secondary winding configured for the transmission of audio related signalling using inductive coupling with an appropriately positioned primary core element/winding, the secondary winding for providing induced audio related signals for an audio loop.

The secondary winding may be a loop. The secondary winding may be connectable to a loop, e.g. via an adapter.

The secondary winding may be configured as a loop for providing audio frequency magnetic fields (i.e. magnetic fields with frequencies in the audio range, such as 20 Hz to 20 kHz, or 400/500 Hz to 4/5 kHz, for use by an appropriately configured and positioned hearing aid. The loop may be configured with an adjustable continuity region. The continuity region may be configured to allow for the adjustment of the effective length of the loop.

The secondary winding/loop may be configured for releasable attachment about a secondary core element.

The secondary winding/loop may be provided with a region of reduced integrity. The region may be configured so as to allow for anticipated fracture at that region when the loop is subjected to a particular tension/shear force.

The loop may be one of: an intrinsic conductive polymer; a blended conductive polymer; a polymer/conductive layer ribbon.

The loop may be a disposable/replaceable loop. The loop may comprise a cloth material (e.g. comprising a cloth material comprising/embedded with a conductive material, such as copper).

The secondary winding/loop may be configured for use with one corresponding secondary core element. The secondary winding/loop may be configured for use with multiple secondary core elements (e.g. a loop may be configured to operable (e.g. changeable/replaceable) with many different primary/secondary core elements).

According to a fifth aspect there is provided a method comprising: providing a primary winding; providing a primary core element; configuring the primary core element and the primary winding for transmission of audio related signalling using inductive coupling with an appropriately positioned secondary core element/winding, the method for providing induced audio related signals for an audio loop.

According to a sixth aspect there is provided a method comprising: providing a secondary core element configured to receive a secondary winding; configuring the secondary core element for transmission of audio related signalling using inductive coupling with an appropriately positioned primary core element/winding, the method for providing induced audio related signals for an audio loop.

According to a seventh aspect there is provided a method comprising providing a primary winding about a primary core element; providing a secondary core element, configured for receiving a secondary winding; appropriately positioning the secondary core element with the primary core element for transmission of audio related signalling using inductive coupling, the method for providing induced audio related signals for an audio loop.

According to an eighth aspect there is provided a method comprising providing a primary winding about a primary core element; providing a secondary winding about a secondary core element; appropriately positioning the secondary core element with the primary core element for transmission of signalling using inductive coupling; modifying the turns ratio by replacing the secondary winding configuration with a different secondary winding configuration, the method for providing alternative signalling configurations for an audio loop for a portable electronic device.

According to a ninth aspect there is provided an apparatus comprising a means for a primary winding and a corresponding means for a primary core element, the means for a primary winding/core element configured for the transmission of audio related signalling using inductive coupling with an appropriately positioned means for a secondary core element/means for a secondary winding, the apparatus for providing induced audio related signals for a means for an audio loop.

According to a tenth aspect there is provided an apparatus comprising a means for a secondary core element, configured to receive a means for a secondary winding, and configured for the transmission of audio related signalling using inductive coupling with an appropriately positioned means for a primary core element/winding, the apparatus for providing induced audio related signals for a means for an audio loop.

According to an eleventh aspect there is provided a means for a secondary winding configured for use with a corresponding means for a secondary core element, the means for a secondary winding configured for the transmission of audio related signalling using inductive coupling with an appropriately positioned means for a primary core element/winding, the means for a secondary winding for providing induced audio related signals for a means for an audio loop.

According to a twelfth aspect there is provided a method comprising: providing a means for a primary winding; providing a means for a primary core element; configuring the means for a primary core element and the means for a primary winding for transmission of audio related signalling using inductive coupling with an appropriately positioned means for a secondary core element/winding, the method for providing induced audio related signals for means for an audio loop.

According to a thirteenth aspect there is provided a method comprising: providing a means for a secondary core element configured to receive a means for a secondary winding; configuring the means for a secondary core element for transmission of audio related signalling using inductive coupling with an appropriately positioned means for a primary core element/winding, the method for providing induced audio related signals for means for an audio loop.

According to a fourteenth aspect there is provided a method comprising: providing a means for a primary winding about a means for a primary core element; providing a secondary core element, configured for receiving a secondary winding; appropriately positioning the means for a secondary core element with the means for a primary core element for transmission of audio related signalling using inductive coupling, the method for providing induced audio related signals for means for an audio loop.

According to a fifteenth aspect there is provided a method comprising: providing a means for a primary winding about a means for a primary core element; providing a means for a secondary winding about a means for a secondary core element; appropriately positioning the means for a secondary core element with the means for a primary core element for transmission of signalling using inductive coupling; modifying the turns ratio by replacing the means for a secondary winding configuration with a different means for a secondary winding configuration, the method for providing alternative signalling configurations for a means for an audio loop for a portable electronic device.

According to a sixteenth aspect there is an apparatus comprising: an apparatus according to features from the first or ninth aspect, and an apparatus according to features of the third or tenth aspect, the apparatus for providing induced audio related signals for an audio loop.

According to a seventeenth aspect there is provided a method for transmitting audio related signals for an audio loop, comprising: using control circuitry to transmit audio related signalling to a primary winding/core element for transmission, using inductive coupling, of audio related signalling to an appropriately positioned secondary core element/winding for transmitting audio related signals for an audio loop.

The method may comprise using the control circuitry to modify the audio related signalling based on the particular secondary winding being used, or the observed secondary impedance (e.g. modifying the signal based on the number of secondary windings provided, modifying the signal based on the observed load, etc.). The method may comprise using the control circuitry to encode/decode audio signals (or other communication signals) for transmitting to the primary winding for transmission (e.g. decoding received cellular communications for transmission).

According to an eighteenth aspect there is provided a computer readable code, stored on a carrier (e.g. compact disc, flash memory, volatile memory, etc.), the computer readable code configured to provide the method of the seventeenth aspect.

According to a nineteenth aspect there is provided a method for transmitting audio related signals for an audio loop/hearing aid, comprising: using control circuitry to receive audio related signalling from a secondary winding/core element, the audio related signalling having been received, using inductive coupling, from an appropriately positioned primary winding/core element, the audio related signals for transmission to an appropriately positioned loop/hearing aid.

According to a twentieth aspect there is provided a computer readable code, stored on a carrier (e.g. compact disc, flash memory, volatile memory, etc.), the computer readable code configured to provide the method of the nineteenth aspect.

The present invention includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 1 shows an embodiment of an apparatus comprising a primary winding and a corresponding primary core element;

FIG. 2 shows an embodiment of an apparatus comprised with control circuitry;

FIG. 3 shows an embodiment of an apparatus comprised with a device;

FIG. 4 shows an embodiment of a secondary apparatus;

FIGS. 6 and 7 shows further embodiments of primary/secondary apparatus in use;

FIG. 8 shows an embodiment of a module comprised with a primary/secondary apparatus;

FIG. 9 shows apparatus with an aperture, and a labyrinth region;

FIG. 10 shows apparatus with an aperture comprised with a device/module;

FIG. 11 shows loop configurations; and

FIG. 12 shows flowcharts of various methods of providing apparatus.

DESCRIPTION OF SPECIFIC EXEMPLARY EMBODIMENTS

Figure 5A:
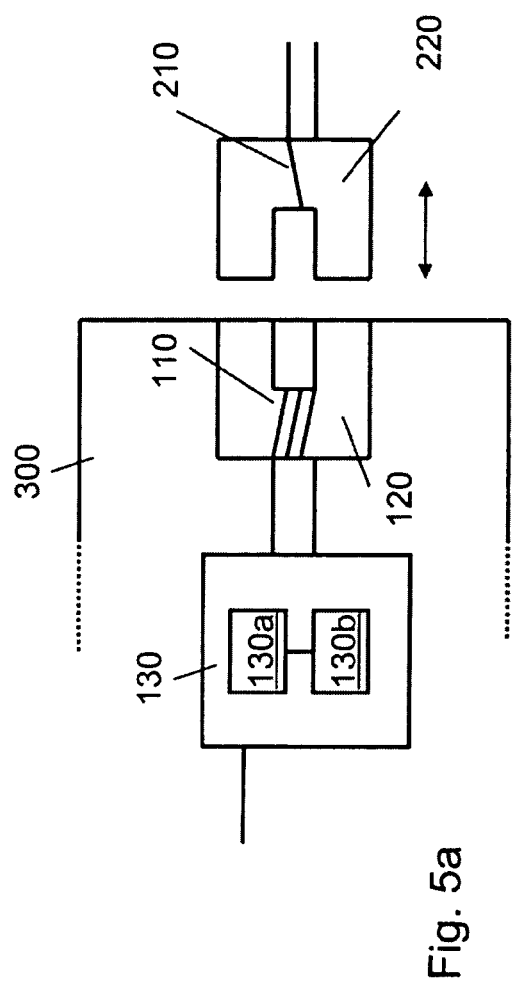
FIG. 5 shows a primary and secondary apparatus in use.

FIG. 1 shows an apparatus 100 comprising a primary winding 110 and a corresponding primary core element 120. Here, the primary winding/core element 110, 120 are configured for the transmission of audio related signalling using inductive coupling with an appropriately positioned secondary core element/winding, 220, 210 (shown, as an example, in dashed lines).

That is, that primary winding/core element 110, 120 are configured to provide a primary of a transformer configuration with an appropriately positioned secondary core element/winding 220, 210. The apparatus 100 is configured for transmission of audio related signalling to an appropriately positioned secondary core element/winding 220, 210. Audio relating signalling may comprise any one or more of: audio signals (e.g. signal to provide for sound, such as signals representative of sounds or digital signals such as Manchester coded signal for providing sound); audio data signals (e.g. signals to provide subsequent apparatus with data regarding audio signals, for example data regarding track listings that a user is about to hear, for example, data for displaying track listings), audio control signals (e.g. signals to control audio in subsequent apparatus, for example increasing volume in the subsequent apparatus or so-called graphic equalisation function).

In this embodiment, the primary core element 120 comprises a material of high magnetic permeability, such as a ferrite (e.g. iron). The primary core is configured for magnetic flux transmission with an appropriately positioned secondary core element 220. In this exemplary arrangement, the primary winding 110 is wound three times round a portion of the primary core element 120. It will readily be appreciated that in alternative embodiments the primary winding 110 may be wound any number of times round the primary core element 120 (e.g. depending on the desired turns ratio).

FIG. 2 shows the apparatus further comprising control circuitry 130. Here, the control circuitry is configured with a signal processor 130a and a memory 130b, in a known manner. The control circuitry 130 is configured to provide audio related signalling to the apparatus 100 for transmission using inductive coupling with an appropriately positioned secondary core element/winding 220, 210.

FIG. 3 shows the apparatus 100/control circuitry 130 configured with a portable electronic device 300. For clarity, those features common to such devices 300 are not shown (e.g. user interfaces, such as displays, keypads, speakers, processors, etc.). In this embodiment, the device 300 is a cellular telephone (i.e. mobile telephone). The apparatus 100/device 300 are configured such that the primary core element 120 is in proximity to an edge region 305 of the casing of the device 300. The apparatus 100/device 300 is configured such that the primary core element 120 is able to transmit audio related signalling to an appropriately positioned secondary core element/winding 220, 210.

It will readily be appreciated that in some embodiments the primary core element 120 (or portion thereof) may be exposed (e.g. not covered by the edge region 305 of the casing), while in other embodiments, the primary core portion may be embedded/contained within the casing (e.g. covered by the casing).

In this embodiment, the control circuitry 130 is configured to receive an audio signal to be heard by a user of the device 300 (e.g. another person talking, device ringing, alert notification, media output, such as music, etc.). Here, the control circuitry 130 is configured to use the audio signal to provide the appropriate audio related signalling for transmission from the apparatus 100 to an appropriately positioned secondary core element/winding 220, 210.

It will readily be appreciated that in some embodiments, the control circuitry 130 may be comprised with control circuitry of the device 300. In some embodiments, the control circuitry 130 may be configured to use (e.g. process) received signals (e.g. received code division multiple access (CDMA) signals, orthogonal frequency-division multiplexing (OFDM) signals, etc., which may be received directly from an antenna of a device 300) to provide audio related signalling. The device 300 may also have a wired or a short range Radio Frequency (RF) connection, for example a Bluetooth connection, to a device that is the source of the audio signal. The device 300 may also have a wired and/or a short range wireless connection (e.g. short range radio frequency), for example a Wireless Local Area Network or other internet (e.g. the Internet) related communication protocol for use as a voice channel e.g. VoIP (Voice Over IP).

FIG. 4a shows a secondary apparatus 200 comprising a secondary winding 210 and a corresponding secondary core element 220. Here, the secondary winding/core element 210, 220 are configured for the transmission (e.g. receipt) of audio related signalling using inductive coupling with an appropriately positioned primary core element/winding, 120, 110 (e.g. as shown in FIG. 1).

In this embodiment, the secondary core element 220 also comprises a material of high magnetic permeability, such as a ferrite (e.g. iron). In this exemplary arrangement, the secondary winding 210 is wound once around a portion of the secondary core element 220. It will readily be appreciated that in alternative embodiments the secondary winding 210 may be wound any number of times round the secondary core element 220 (e.g. depending on the desired turns ratio).

FIG. 4b shows the secondary apparatus 200 further comprising a loop 400. In this embodiment, the secondary winding 210 is provided by the loop 400 (i.e. the loop is wound round a portion of the secondary core element 220). FIG. 4c shows a further embodiment is which the loop 400 is attachable/detachable from the secondary apparatus 200. Here, the loop 400 is attachable/detachable from the secondary apparatus 200 via an adapter 450. It will readily be appreciated that by attaching the loop 400 to the adapter 450, that there may be provided multiple secondary windings (i.e. depending on desired turns ratio of the secondary winding 210). Similarly, the loop may not be configured to be attachable/detachable with the adapter, but the secondary winding 210 may still be removable from the secondary core element 200.

In some embodiments, the adapter 450 is further provided with control circuitry (e.g. control circuitry similar to the control circuitry 130 described above), which is able to process (e.g. modify, such as filtering) audio related signalling for use by the loop 400. A skilled reader would readily be able to implement such an arrangement.

Figure 5B:
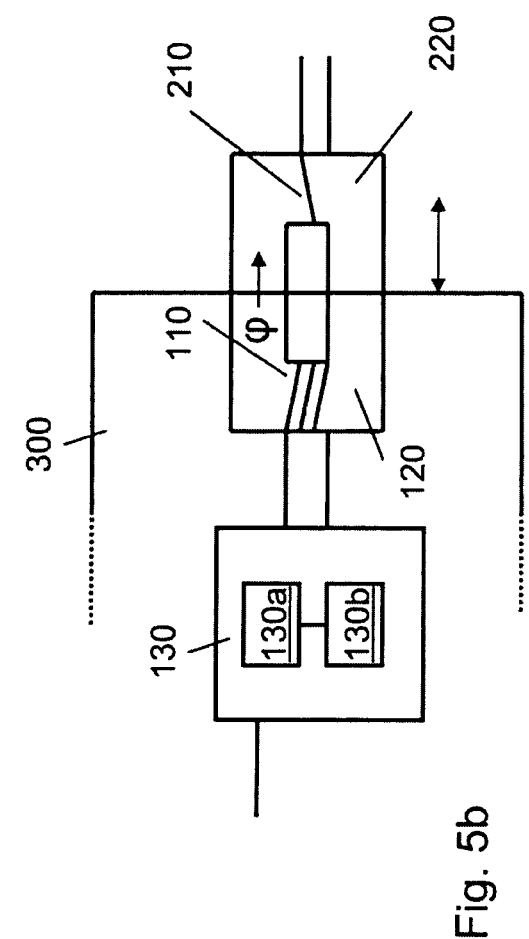

In use, and as shown in FIG. 5a and 5b, a user of a device 300 is able to bring the secondary apparatus 200 into proximity with the first apparatus 100 so as to allow for primary and secondary core elements 120, 220 to be appropriately positioned for transmission of audio related signalling (e.g. audio related signalling from the primary apparatus 100 to the secondary apparatus 200). When positioned, a time varying audio related signal which is provided to the primary winding 110 will generate corresponding varying magnetic flux, $\phi$, which circulates in both the appropriately positioned primary and secondary core elements 120, 220 (i.e. the magnetic flux $\phi$ is communicated primarily, save for leakage, through the primary and secondary core elements 120, 220). As a result, an induced audio related signal will be induced in the secondary winding 210, the induced signal being indicative of the time varying magnetic flux, $d\phi/dt$. In this embodiment, the induced audio related signal will have a higher current, but lower voltage, than that of the corresponding signal in the primary (i.e. step down due to turns ratio). The higher current can be used in a low resistance loop to provide a larger magnetic field (e.g. for use in inducing an audio signal in a hearing aid) than would have been provided by the signal in the primary winding 110.

The transmission of audio related signalling in this regard can be considered to be only between the primary apparatus 100 and the secondary apparatus 200 (e.g. unicast). In use, the configuration of primary/secondary core elements 120, 220 may be considered to be a spilt core transformer. In this embodiment, the induced audio related signal has frequencies within the audio range (e.g. just above D.C., such as 20 Hz, up to 20 kHz). In some embodiments the induced audio related signal has frequencies within 400/500 Hz to 4/5 kHz. That is, the induced audio related signal may be considered to provide an audio frequency magnetic field.

It will readily be appreciated that the apparatus 100/control circuitry 130 may be configured to provide other signals to other appropriately positioned secondary core elements/windings/loops 210, 220, 400. In some embodiments, the secondary winding 210 may not act to provide step down (i.e. higher current), but may act to provide step-up (i.e. higher voltage). The above embodiment allows for one or both of the secondary winding 210/secondary core element 220 to be replaced (e.g. replaced by a user to repair a fault, provide a different styling, provide a different turns ratio, such as increasing/decreasing the turns ratio for a particular audio configuration for a loop/hearing aid).

In some embodiments, the control circuitry 130 may be configured to observe the load on the secondary winding 210 to determine the appropriate signalling for the particular positioned secondary core element 220/winding 210.

In some embodiments the primary apparatus 100 may be additionally configured for hearing aid compatibility (HAC), for example, when the secondary has not been positioned. A skilled reader will readily appreciate that HAC can be used to induce an audio related signal in an appropriately configured and positioned hearing aid, for example, without the use of a loop (or loopset). In such an arrangement a user may position the device 300 in proximity to a hearing aid for HAC communication from the primary apparatus 100 to the appropriately configured hearing aid. The user may select (e.g. by using soft/hard switching) which communication is desired (e.g. HAC communication, or secondary apparatus communication). When the secondary core element/winding 220, 210 is not appropriately positioned, the flux leakage from the (un-combined) transformer configuration is sufficient to provide for induction using HAC.

In some embodiments the control circuitry 130 may be configured to detect whether the secondary core element 220/winding 210 has been appropriately positioned to determine the mode of transmission (e.g. by measuring the load impedance).

It will also be appreciated that in some embodiments the secondary core element/winding 220, 210 may be appropriately positioned with the primary core element/winding 110, 120 over an intermediate gap, for example, over at least a portion of casing of a portable electronic device 300.

In some embodiments, the secondary core element 220 may be configured to be attachable/detachable with the primary core element 120/edge region 305 (see FIG. 3), for example, by using an adhesive (not shown), restraining elements (not shown), hook and loop (not shown) etc.

FIG. 6 shows an embodiment in which the secondary core element 220 is adjustable with respect to the primary core element, which here is provided by using a displacement mechanism 470. Here, the displacement mechanism 470 is a hinge at the edge region 305/primary core element 120 of the device 300. Here, the secondary core element 220 can be rotated relative to the primary core element 120 so as to be appropriately positioned. Such an embodiment allows for the secondary core element 220 to be provided with the device 300/primary apparatus 100. Such an arrangement allows the secondary winding 210 to be moved/replaced (e.g. by a user in order to provide an alternative turns ratio) by rotating the secondary core element 220 from a closed configuration to an open configuration. In one embodiment, it may be possible to remove the secondary core element 220 completely from attachment with the edge region 305, only when the secondary core element is sufficiently displaced e.g. by allowing unhooking of the secondary core element 220 (e.g. hook/latch mechanism).

FIG. 7a and 7b shows further closed and open configurations in which the secondary core element 220 is displaceable (e.g. in this instance linearly displaceable) from the primary core element 120 by using a displacement mechanism 470. Here, the secondary core element 220 is provided integral to the device 300, but the displacement element 470 allows for the removal/replacement of the secondary winding 210 by allowing for linear movement from the closed (appropriately positioned for transmission) configuration to the open configuration, in which a gap exists to include/remove a secondary winding 210.

It will readily be appreciated that the secondary core element 220 may be provided integral to the device 300 in other embodiments (for example, in the embodiment in FIG. 6). In such cases, the primary/secondary core elements 120, 220 may be provided with the device 300, but still configured to allow for open/closing configurations so as to allow for replacement of the secondary winding 210. The apparatus 100, 200 and the device 300 may be configured such that the secondary core element 220 is housed within the device 300 (e.g. partially/fully housed). In such a configuration the secondary core element 220 would be configured to be removable (partially/fully removable) from the device 300 (e.g. removable to allow for changing of the secondary winding 210).

In such arrangements, the primary core element/winding 120, 110 may still be additionally configured for hearing aid compatibility (HAC) when the secondary core element 220 has not been positioned. For example, when the secondary core element 220 has been adjusted so as to be in the open configuration, the primary/secondary apparatus 100, 200 may be configured such that the flux leakage from the (un-combined) transformer configuration is sufficient to provide for induction using HAC. In such arrangements, the adjustment of the second core element 220 to the open configuration may be monitored by the control circuitry 130, so as to alter the mode of operation from loop configuration to HAC configuration, and vice versa. Alternatively, the mode may be switched by a user, or by monitoring the load impedance (as above).

FIG. 8a shows a further embodiment, similar to those described above, in which the primary apparatus 100, control circuitry 130, secondary apparatus 200, and displacement mechanism 470 are configured with a supplementary module 600 for a portable electronic device 300 (e.g. a portable supplementary module 600).

Here, the module 600 is further configured with communication circuitry 610. The communication circuitry comprises a communication processor 610a and an antenna 610b, configured for short range communication with a further device (e.g. Wireless Local Area Network, Bluetooth, ZigBee, Near Field Communication, etc.). In such an arrangement, data may be communicated from a further device 300, such as a cellular telephone, gaming device, etc. using their (existing) device control circuitry 330 to provide data/signals to the module for communication with a loop 400. Here, the device control circuitry 330 is shown to have a device processor 330a, device memory 330b, and device communication circuitry 310.

Again, the loop 400/secondary winding 210 may be added/removed using the open/closed configurations.

FIG. 8b shows the further embodiment in which the supplementary module 600 is configured for wired communication with the further device 300 using a wired link 650. In this exemplary embodiment, the secondary apparatus 200 is integral to the module, but still configured to allow for addition/removal of a secondary winding 210/loop 400.

In use, a user may connect the module (e.g. wired/wirelessly) to a device 300, such as a cellular telephone, to allows signals/data to be communicated (e.g. using short range Radio Frequencies) to/from the module 600 so as to provide for audio related signalling for a loop 400. In a similar manner to that described above, the supplementary module 600 may be configured to additionally provide HAC.

In some embodiments, a portion of each of the primary/secondary core elements 120, 220 may be configured such that when in the closed configuration there is provided an aperture 700 to allow for addition/removal of the secondary winding 210/loop 400. FIG. 9a shows such a configuration when using the hinge. In use, a user may still add/remove the secondary winding 210/loop when the secondary core element 220 has been positioned with respect to the primary core element 120 in the closed configuration. It will readily be appreciated that the same/similar aperture 700 arrangement may be used on any of the other embodiments (e.g. using the displacement mechanism 470 of FIG. 7).

In some embodiments, the apparatus 100, 200 may be configured to allow for sufficient flux leakage to occur so as to provide for HAC when in the closed configuration.

FIG. 9b shows an embodiment in which each of the primary and secondary core elements 120, 220 are provided with a labyrinth arrangement 125, 225, configured for co-operation when the secondary core element 220 is appropriately positioned with respect to the primary core element 120. In this embodiment, when the secondary core element is displaced (i.e. moved away from the position for transmission), then the labyrinth arrangement 125, 225 serves to inhibit accidental removal of the secondary winding 210. It will readily be appreciated that the same/similar labyrinth arrangement 125, 225 may be used in addition to an aperture 700. FIG. 9c shows a further labyrinth configuration.

FIG. 10a shows an embodiment comprising a device 300, or module 600 in which the primary core element 110 is appropriately positioned with a secondary core element 220 so as to be adjoined (e.g. adjoined such that there is not provided for any relative movement of the primary core element 120 relative to the secondary core element 220) and wherein there is provided an aperture 700. Again, the aperture 700 is configured to allow for addition/removal of a secondary winding 210/400. Here, the primary apparatus 100/secondary apparatus 200 are configured such that the aperture 700 is exposed (i.e. outside the module/device 600, 300. However, in alternative embodiments that need not be the case. In alternative embodiments, the primary/secondary core element 120, 220 may be provided within the device 300/module 600. FIG. 10b shows such a configuration. Here, in this exemplary embodiment, the primary/secondary core elements 120, 220 are additionally provided with labyrinth regions 125, 225.

FIG. 11a shows an exemplary embodiment of a loop 400 for use with the apparatus 100, 200 described above (i.e. a loop for providing audio frequency magnetic fields for use by an appropriately configured hearing aid). Here, the loop 400 is provided by a conducting polymer (e.g. a conductive ribbon/braid, such as copper ribbon/braid, embedded in a polymer; an intrinsic conducting polymer such as Poly(3,4-ethylenedioxythiophene) poly(styrenesulfonate (PEDOT: PSS); PANI/CSA, a blended metallic/polymer for conduction, etc.). Providing the loop 400 by a conducting polymer means that the loop 400 may be washable, and/or more flexible/easy to manufacture (i.e. decoratively manufacture) compared to existing loops.

In alternative embodiments, the loop may be provided not by a conductive polymer, but by a different material, such as a cloth/metallic composite. For example, the loop may be provided by a metallic conductor (e.g. a copper braid/mesh) comprised within a cloth (i.e. cloth outer layer). Such a loop would also be washable, and/or more flexible/easy to manufacture (i.e. decoratively manufacture) compared to existing loops.

Here, the loop is configured to be placed about (e.g. wound round) the secondary core element 220, such that audio related signalling is induced in the loop for subsequent induction with a hearing aid (e.g. a hearing aid having a telecoil). FIG. 11a shows the loop comprising a region 405 of reduced integrity (i.e. reduced mechanical integrity). Here, the region 405 is configured such that when a force (e.g. tension/shearing force) of a particular magnitude is applied to the loop 400, the region 405 is configured to fracture (i.e. fracture prior to another portion of the loop 400). In the present embodiment the region 405 is provided by a region of perforation in the loop 400. Such an embodiment can be particularly useful to address Health and Safety concerns e.g. inhibiting asphyxiation.

FIG. 11b and 11c shows a further embodiment of a loop 400 in which the loop 400 is provided with fasteners 410, 420, such as those provided by hook and loop fasteners, which, in this embodiment, are themselves provided by a conductive polymer. Here, the loop 400 is configured with one hook fastener 410 and three loop fasteners 420a-c. In FIG. 11b the hook fastener 410 is attached to a first (hidden from view) loop fastener 420a. In FIG. 11c the hook fastener 410 is attached to a last (hidden from view) loop fastener 420c, such that the effective circumference of the loop 400 has been reduced in size. In effect, the affixed loop and fastener acts as a continuity region 430, providing (when touching) for continuity from one side of the loop 400 to the other. Such an arrangement allows for: the resistive load provided by the loop 400 to be alterable by a user; for there to be provided a region of reduced integrity (i.e. the hook/loop connection point); and/or for the loop 400 to be sized according to the user's requirements.

FIG. 11d shows a further embodiment in which the loop 400 is provided with an alternative continuity region 430 for adjusting the effective length of the loop 400. Here, the continuity region 430 is provided by a contact 440 (e.g. a conductive polymer contact, a contact for connecting, or bring into electric contact, sides of the loop, etc.), which acts to slidably connect one side of the loop 400 with the other. As shown in FIG. 11d, the loop 400 is positioned is situ with a primary/secondary core element 120, 220. The effective length of the loop 400 can be adjusted by slidably moving the contact 440.

It will be appreciated that in some embodiments the loop 400 may be provided with connectors, for connecting ends of the loop 400 together, or for connecting to an adapter 450 as shown in FIG. 4c. Similarly, the connectors may be provided so as to give a region of reduced integrity. In the embodiment in which the loop 400 is connected to the adapter 450, one of the connectors may be easier to remove than the other, such that were a force to be applied to the loop 400, the connector that is easier to remove would be removed, leaving the loop 400 connected to the adapter 450. Such an arrangement would provide that the loop 400 does not completely detach from the adapter 450/secondary apparatus 200/device 300.

In further embodiments still it will be appreciated that the loop 400 may be comprised with clothing, headgear, accessories (e.g. bags). A skilled reader would readily be able to implement such further embodiments.

FIG. 12*a* shows a flowchart 1000 of a method for providing induced audio related signals for an audio loop comprising providing 1010 a primary winding, providing 1020 a primary core element; configuring 1030 the primary core element and the primary winding for transmission of audio related signalling using inductive coupling with an appropriately positioned secondary core element/winding.

FIG. 12*b* shows a flowchart 1100 of a method for providing induced audio related signals for an audio loop, comprising: providing 1110 a secondary core element configured to receive a secondary winding; configuring the secondary core element 1120 for transmission of audio related signalling using inductive coupling with an appropriately positioned primary core element/winding.

FIG. 12*c* shows a flowchart 1200 of a method for providing induced audio related signals for an audio loop, comprising: providing 1210 a primary winding about a primary core element; providing 1220 a secondary core element, configured for receiving a secondary winding; appropriately positioning 1230 the secondary core element with the primary core element for transmission of audio related signalling using inductive coupling.

FIG. 12*d* shows a flowchart 1300 of a method for providing alternative signalling configurations for an audio loop for a portable electronic device, comprising: providing 1310 a primary winding about a primary core element; providing 1320 a secondary winding about a secondary core element; appropriately positioning 1330 the secondary core element with the primary core element for transmission of signalling using inductive coupling; and modifying 1340 the turns ratio by replacing the secondary winding configuration with a different secondary winding configuration.

It will readily be appreciated that the geometric/topological configuration of the primary secondary windings 110, 210, and primary/secondary core elements 120, 220 in the above embodiments is exemplary only, and in other embodiments alternative configurations may be used which serve the same purpose.

It will be appreciated to the skilled reader that the device/windings/core elements/circuitry and/or other features of particular apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory.

It will be appreciated that the aforementioned device/windings/core elements/circuitry may have other functions in addition to the mentioned functions, and that these functions may be performed by the same circuit/apparatus/element.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a primary winding and a corresponding primary core element, the primary winding/core element configured for the transmission of audio related signalling, using inductive coupling, with an appropriately positioned secondary core element/winding, the apparatus for providing induced audio related signals for an audio loop, wherein the apparatus is configured such that the primary core element is appropriately positioned with a secondary core element so as to be adjoined but define elsewhere an aperture therebetween, the aperture configured to allow for addition/removal of a secondary winding, wherein the aperture is configured so as to provide a labyrinth region, the labyrinth region configured to hinder unintentional removal of the secondary winding from the secondary core element when in an open configuration.

2. An apparatus according to claim 1, configured such that it provides for a secondary winding to be removable with respect to the primary winding/core element.

3. An apparatus according to claim 1, further comprising a displacement mechanism for open/close positioning of a secondary core element with the primary core element, the apparatus configured to allow for the addition/removal of a secondary winding from a secondary core element when in an open configuration.

4. An apparatus according to claim 1, wherein the primary core element is configured to be positioned with a secondary core element over at least a portion of a casing of a portable electronic device.

5. An apparatus according to claim 1, wherein the apparatus is configured to be attachable/detachable with a secondary core element.

6. An apparatus according to claim 1, further comprising control circuitry in communication with the primary winding, the control circuitry for providing audio related signalling to the primary winding for transmission with an appropriately positioned secondary winding/core element.

7. An apparatus according to claim 1, wherein the apparatus further comprises a secondary core element/winding, the secondary winding configured about the secondary core element for communication of audio related signals, and wherein the secondary winding comprises a loop for providing induced audio related signals, and the loop comprises a conductive polymer which is one of, an intrinsic conductive polymer; a blended conductive polymer; a polymer/conductive layer ribbon.

8. A portable device comprising the apparatus according to claim 1, and wherein the device is one or more of: a cellular telephone; multimedia device; gaming device; navigation device; personal digital assistant; a supplementary module for a cellular telephone; a supplementary module for a multimedia device; a supplementary module for a gaming device; a supplementary module for a navigation device; a supplementary module for a personal digital assistant.

9. A portable electronic device comprising the apparatus according to claim 1.

10. An apparatus comprising a secondary core element, configured to receive a secondary winding, and configured for the transmission of audio related signalling, using inductive coupling, with an appropriately positioned primary core element/winding, the apparatus for providing induced audio related signals for an audio loop, wherein the apparatus is configured such that the secondary core element is appropriately positioned with a primary core element so as to be adjoined but define elsewhere an aperture therebetween, the aperture configured to allow for addition/removal of the secondary winding, wherein the aperture is configured so as to provide a labyrinth region, the labyrinth region configured to hinder unintentional removal of the secondary winding from the secondary core element when in an open configuration.

11. An apparatus according to claim 10, wherein the secondary core element is configured to be positioned with the primary core element over at least a portion of casing of a portable electronic device.

12. An apparatus according to claim 10, further comprising a secondary winding, the secondary winding configured about the secondary core element to provide for transmission of audio related signalling for a loop.

13. An apparatus comprising: a first apparatus comprising a primary winding and a corresponding primary core element, the primary winding/core element configured for the transmission of audio related signalling, using inductive coupling, with a second apparatus comprising a secondary core element, configured to receive a secondary winding, and configured for the transmission of audio related signalling, using inductive coupling with the first apparatus the apparatus for providing induced audio related signals for an audio loop, wherein the primary core element is appropriately positioned with the secondary core element so as to be adjoined but define elsewhere an aperture therebetween, the aperture configured to allow for addition/removal of the secondary winding, wherein the aperture is configured so as to provide a labyrinth region, the labyrinth region configured to hinder unintentional removal of the secondary winding from the secondary core element when in an open configuration.

14. A secondary winding configured for use with a corresponding secondary core element, the secondary winding configured for the transmission of audio related signalling, using inductive coupling, with an appropriately positioned primary core element/winding, the secondary winding for providing induced audio related signals for an audio loop, wherein the apparatus is configured such that the secondary core element is appropriately positioned with a primary core element so as to be adjoined but define elsewhere an aperture therebetween, the aperture configured to allow for addition/removal of the secondary winding, wherein the aperture is configured so as to provide a labyrinth region, the labyrinth region configured to hinder unintentional removal of the secondary winding from the secondary core element when in an open configuration.

15. A secondary winding according to claim 14, wherein the winding is a loop for providing audio frequency magnetic fields for use by an appropriately configured and positioned hearing aid, and the loop is configured with an adjustable continuity region, the continuity region configured to allow for the adjustment of the effective length of the loop.

16. A secondary winding according to claim 14, wherein the secondary winding is a loop or is connectable to a loop for providing audio frequency magnetic fields for use by an appropriately configured and positioned hearing aid.

17. A secondary winding according to claim 14, wherein the secondary winding is a loop or is connectable to a loop and wherein secondary winding/loop is provided with a region of reduced integrity, so as to allow for anticipated fracture at that region when the loop is subjected to a particular tension/shear force.

18. A method comprising: providing a primary winding; providing a primary core element; and configuring the primary core element and the primary winding for transmission of audio related signalling using inductive coupling with an appropriately positioned secondary core element/winding, the method for providing induced audio related signals for an audio loop, wherein the primary core element is appropriately positioned with a secondary core element so as to be adjoined but define elsewhere an aperture therebetween, the aperture configured to allow for addition/removal of a secondary winding, wherein the aperture is configured so as to provide a labyrinth region, the labyrinth region configured to hinder unintentional removal of the secondary winding from the secondary core element when in an open configuration.

19. A method comprising: providing a secondary core element configured to receive a secondary winding; and configuring the secondary core element for transmission of audio related signalling using inductive coupling with an appropriately positioned primary core element/winding, the method for providing induced audio related signals for an audio loop, wherein the secondary core element is appropriately positioned with a primary core element so as to be adjoined but define elsewhere an aperture therebetween, the aperture configured to allow for addition/removal of the secondary winding, wherein the aperture is configured so as to provide a labyrinth region, the labyrinth region configured to hinder unintentional removal of the secondary winding from the secondary core element when in an open configuration.

20. A method comprising: providing a primary winding about a primary core element; providing a secondary core element, configured for receiving a secondary winding; and appropriately positioning the secondary core element with the primary core element for transmission of audio related signalling using inductive coupling, the method for providing induced audio related signals for an audio loop, wherein the primary core element is appropriately positioned with the secondary core element so as to be adjoined but define elsewhere an aperture therebetween, the aperture configured to allow for addition/removal of the secondary winding, wherein the aperture is configured so as to provide a labyrinth region, the labyrinth region configured to hinder unintentional removal of the secondary winding from the secondary core element when in an open configuration.

21. An apparatus comprising a means for a primary winding and a corresponding means for a primary core element, the means for a primary winding/core element configured for the transmission of audio related signalling using inductive coupling with an appropriately positioned means for a secondary core element/means for a secondary winding, the apparatus for providing induced audio related signals for a means for an audio loop, wherein the apparatus is configured such that the means for a primary core element is appropriately positioned with a means for a secondary core element so as to be adjoined but define elsewhere an aperture therebetween, the aperture configured to allow for addition/removal of the means for a secondary winding, wherein the aperture is confi ured so as to provide a labyrinth region, the labyrinth region configured to hinder unintentional removal of the means for a secondary winding from the means for a secondary core element when in an open configuration.

22. An apparatus comprising a means for a secondary core element, configured to receive a means for a secondary winding, and configured for the transmission of audio related signalling using inductive coupling with an appropriately positioned means for a primary core element/winding, the apparatus for providing induced audio related signals for an audio loop, wherein the apparatus is configured such that the means for a secondary core element is appropriately positioned with a means for a primary core element so as to be adjoined but define elsewhere an aperture therebetween, the aperture configured to allow for addition/removal of the means for a secondary winding, wherein the aperture is configured so as to provide a labyrinth region, the labyrinth region configured to hinder unintentional removal of the means for a secondary winding from the means for a secondary core element when in an open configuration.

23. A means for a secondary winding configured for use with a corresponding means for secondary core element, the means for a secondary winding configured for the transmission of audio related signalling using inductive coupling with an appropriately positioned means for a primary core element/winding, the means for a secondary winding for providing induced audio related signals for a means for an audio loop, wherein the means for a secondary core element is appropriately positioned with a means for a primary core element so as to be adjoined but define elsewhere an aperture therebetween, the aperture configured to allow for addition/removal of the means for a secondary winding, wherein the aperture is configured so as to provide a labyrinth region, the labyrinth region configured to hinder unintentional removal of the means for a secondary winding from the means for a secondary core element when in an open configuration.

24. A method comprising: providing a means for a primary winding; providing a means for a primary core element; and configuring the means for a primary core element and the means for a primary winding for transmission of audio related signalling using inductive coupling with an appropriately positioned means for a secondary core element/winding, the method for providing induced audio related signals for a means for an audio loop, wherein the means for a primary core element is appropriately positioned with a means for a secondary core element so as to be adjoined but define elsewhere an aperture therebetween, the aperture configured to allow for addition/removal of a means for a secondary winding, wherein the aperture is configured so as to provide a labyrinth region, the labyrinth region configured to hinder unintentional removal of the means for a secondary winding from the means for a secondary core element when in an open configuration.

25. A method comprising: using control circuitry to transmit audio related signalling to a primary winding/core element for transmission, using inductive coupling, of audio related signalling to an appropriately positioned secondary core element/winding for transmitting audio related signals for an audio loop, wherein a primary core element is appropriately positioned with a secondary core element so as to be adjoined but define elsewhere an aperture therebetween, the aperture configured, to allow for addition/removal of a secondary winding, wherein the aperture is configured so as to provide a labyrinth region, the labyrinth region configured to hinder unintentional removal of the secondary winding from the secondary core element when in an open configuration.

26. A computer readable code, stored on a carrier, the computer readable code configured to provide the method of claim 25.

* * * * *